United States Patent [19]

Jansen

[11] Patent Number: 5,608,613

[45] Date of Patent: Mar. 4, 1997

[54] FLYBACK CONVERTER

[75] Inventor: Arian Jansen, Crolles, France

[73] Assignee: Hewlett-Packard Company, Palo Alto, Calif.

[21] Appl. No.: 675,300

[22] Filed: Jul. 1, 1996

[30] Foreign Application Priority Data

Jul. 31, 1995 [EP] European Pat. Off. ............ 95410075

[51] Int. Cl.⁶ .................................................. H02M 3/335
[52] U.S. Cl. .................... 363/21; 363/97; 363/131
[58] Field of Search ................... 363/20, 21, 84, 363/89, 95, 97, 123, 127, 131

[56] References Cited

U.S. PATENT DOCUMENTS

| 4,631,652 | 12/1986 | Wendt | 363/16 |
|---|---|---|---|
| 4,731,721 | 3/1988 | Igashira et al. | 363/56 |
| 4,764,857 | 8/1988 | Konopka | 363/49 |
| 4,785,387 | 11/1988 | Lee | 363/21 |
| 5,146,394 | 9/1992 | Ishii et al. | 363/16 |
| 5,227,964 | 7/1993 | Furuhata | 363/56 |
| 5,396,410 | 3/1995 | Okochi et al. | 363/21 |
| 5,424,932 | 6/1995 | Inou et al. | 363/21 |

FOREIGN PATENT DOCUMENTS 0551212  7/1993  European Pat. Off. .

OTHER PUBLICATIONS

Patent Abstracts of Japan vol. 016 No. 567 (E–1296), & JP-A-04 217862 (Toshiba Corp) 7 Aug. 1992 *abstract* Okochi Sadao.

*Primary Examiner*—Peter S. Wong
*Assistant Examiner*—Adolf Berhane

[57] ABSTRACT

A flyback converter is provided in which at least part of the energy stored in the primary leakage inductance of the transformer is transferred to the output circuit and converted into a dc component of the converter output so that it is dissipated as useful energy in the load. This is achieved by providing first and second tuning capacitors connected across the transformer primary and secondary windings respectively. The first tuning capacitor sets up a ringing on turn off of the primary current, this ringing being visible on the secondary side of the transformer. The second tuning capacitor creates an anti-phase component to the ringing signal. The main ringing signal and the anti-phase component are then mixed in a non-linear device (for example, the rectifier diode of the output circuit) to produce a dc component that can be dissipated in the load.

13 Claims, 9 Drawing Sheets

FLYBACK CONVERTER

FIELD OF THE INVENTION

The present invention relates to a switched mode power supply in the form of a flyback converter.

BACKGROUND OF THE INVENTION

Flyback converters are well known in the art and FIG. 1 of the accompanying drawings shows the main components of a basic flyback converter 10. The converter 10 comprises an input circuit 11 coupled to an output circuit 12 through an energy-storing transformer 13 that has primary and secondary windings 14 and 15 respectively. The input circuit 11 comprises a switching device 16 (shown as a MOSFET in FIG. 1) connected in series with the transformer primary winding 14, and a control block 17 for controlling the cyclic turning on and off of the switching device 16. The output circuit 12 comprises a diode 18 connected in series with the transformer secondary winding 15, and a reservoir capacitor 19 connected in parallel with the series combination of the secondary winding 15 and diode 18 and across which the converter output is produced. A load 20 is connected across the converter output.

The basic operation of the Figure converter is fairly simple and will now be briefly described with reference to the diagrammatic time plots of FIG. 2. The MOSFET switching device 16 is cyclically turned on by a waveform $V_{gs}$ applied to its gate, the MOSFET being on (see waveform $V_{ds}$, the voltage across the MOSFET) when the gate voltage waveform $V_{gs}$ is high. When the MOSFET is on, current $I_d$ builds at a steady rate through the transformer primary winding 14 and energy is stored in the flux in the transformer core. During this phase, no current flows in the secondary winding as the diode 18 is reverse biased, and the load 20 is supplied with current from the reservoir capacitor 19.

When the gate voltage $V_{gs}$ goes low, the MOSFET turns off and the magnetic flux in the transformer progressively collapses driving a current $I_{rect}$ through the secondary winding 15 and diode 18 towards the load 20. In the present example, the flux in the transformer core does not fall to zero prior to the MOSFET turning on again to restart the cycle of operation; as a result, the current $I_{rect}$ also does not reach zero before the cycle restarts. This mode of operation is known as the continuous mode. It is also possible for the converter to operate in a discontinous mode in which the transformer is fully discharged before the MOSFET is turned on again in which case the current $I_{rect}$ will fall to zero earlier than the turn on of the MOSFET.

The output voltage of the converter 10 is regulated by the feedback of the output voltage to the control block 17. Generally, the output circuit will be electrically isolated from the input circuit so that the feedback path will normally include an isolating element (this is signified in FIG. 1 by using a dashed oval to depict the feedback loop as only indirectly connected to the output circuit). Typically, the switching frequency of the switching device 16 is fixed and the control block 17 controls the duty cycle of the switching device (i.e. effects a pulse width modulation control) to keep the output voltage constant.

In the waveform of the voltage $V_{ds}$ across the MOSFET, a voltage spike can be seen immediately following turn off of the MOSFET, this spike being superimposed in the voltage step present as the supply voltage appears across the MOSFET. This voltage spike is due to the dissipation of the energy stored in the primary leakage inductance during the immediately preceding period when the MOSFET was on and the transformer was charging. Since the energy in the leakage inductance cannot be discharged on the secondary side of the transformer, it will be dissipated in the transformer or MOSFET unless a dummy load ("snubber") is provided on the primary side; the provision of snubber circuits is normal practice and is shown in FIG. 1 by the dotted components.

For a transformer in a flyback converter for a mains-powered, low voltage power supply unit (for example, a 5v supply for electronic equipment), the need to comply with a variety of safety regulations means that the leakage inductance can be up to one fifth of the main inductance. The efficiency of the power supply in this case is thus immediately limited to 80% due just to this phenomenon; the practical efficiency will then be around 60% for low line operations.

It is an object of the present invention to provide a flyback converter in which the energy loss due to primary leakage inductance is reduced.

SUMMARY OF THE INVENTION

According to the present invention, at least part of the energy stored in the primary leakage inductance is transferred to the output circuit and converted into a dc component of the converter output so that it is dissipated as useful energy in the load.

More particularly, according to the present invention, there is provided a flyback converter in which first and second tuning capacitances are provided that parallel, in ac terms, the primary and secondary windings respectively of the flyback-converter transformer, these tuning capacitances having values such that:

with the output-circuit diode in a conducting state a first resonant circuit is formed, with resonant frequency $F_R$, in which the primary leakage inductance and the first tuning capacitance play significant parts, and with the output-circuit diode in a non-conducting state a second resonant circuit is formed, with resonant frequency substantially equal to the frequency $F_R$, in which the primary leakage inductance and the second tuning capacitance play significant parts but for which there exists a voltage/current phase relationship either side of resonance that is anti-phase to that for the first resonant circuit;

the output circuit including a non-linear device operative to combine the anti-phase components of ringing produced by the first and second resonant circuits following turn off of the input-circuit switching device, whereby energy stored in the primary leakage inductance is at least partially transferred to the secondary circuit and converted into a dc component of the converter output.

The first tuning capacitance may be provided at least in part by a capacitor connected across the primary winding; however, where the switching device is a MOSFET, then the source-drain capacitance of the MOSFET will provide, at least in part, the first tuning capacitance: As regards the second tuning capacitance, this can be provided at least in part by a capacitor connected across either the secondary winding or the diode; furthermore, where the converter has multiple output circuits, the second tuning capacitance can be divided between the output circuits.

The non-linear device will generally be constituted by the output-circuit diode. However, it is also possible to use other arrangements such as a MOSFET connected in series with the diode, and means for switching the MOSFET on and off in synchronism with said ringing.

The tuning capacitances themselves can also store considerable amounts of energy which will be discharged through the input-circuit switching device if a conventional PWM control block is used to control the cyclic turning on and off of the switching device. To cope with this potential problem, the turn on timing of the switching device is preferably controlled to coincide with a minimum of the voltage thereacross. Accordingly, the switching-device control means preferably comprises sensing means for sensing the voltage across the switching device when the latter is off, determining means for determining a minimum of the voltage sensed by the sensing means, and turn-on means for turning on the switching device at a said minimum of the voltage thereacross as determined by the determining means. Advantageously, the sensing means comprises a sensing winding wound jointly with the transformer primary and secondary windings, whilst the determining means comprises integration means for integrating the voltage sensed by the sensing winding, and means for detecting a zero crossing of the voltage integrated by the integration means, this zero crossing being indicative of the said minimum of the voltage across the switching device.

In order to ensure that the switching device is turned on in abnormal situations where no minimum volatege is detected, the control means preferably further comprises time-out means for initiating turn on of the switching device a predetermined time after when the switching device was last on unless the latter is earlier turned on again by the turn-on means.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Rather than going immediately into a description of embodiments of the invention, the first part of the following aims at building an understanding of the invention by a consideration of certain contributory effects.

It will be recalled from the prior art discussion that in a normal flyback converter the energy stored in the primary leakage inductance cannot be usefully employed to drive current through the load but instead must be dissipated in the converter input circuit.

In providing a solution to this unwanted energy loss, the present invention can be characterised as first making the energy stored in the primary leakage inductanc available for use in the output circuit and then transferring this energy to the load as a dc component of the converter output.

Figure 3:
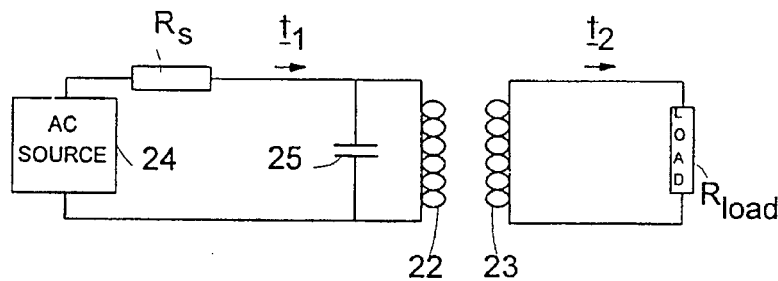
FIG. 3 is a diagram illustrating the use of a tuned tank coil for transferring power between inductors with limited coupling.

It is known from the world of high frequency amplifiers that energy can be transferred between inductors that have limited coupling. FIG. 3 shows a tuned tank coil circuit that permits such a transfer between inductors 22 and 23 that are coupled by a coupling factor k. In the FIG. 3 arrangement, an ac source 24 with impedance $R_s$ drives a current $I_1$ into a tuned circuit comprising the inductor 22 and a capacitor 25. The inductor 23 is connected to a load $R_{load}$.

Suppose that $R_{load} = R_s$, then for complete power transfer to the load, $I_1$ needs to be equal to $I_2$. It is possible to meet this condition due to the presence of the tuned circuit since, if $I_{res}$ is the current in the tuned circuit and Q the quality factor of the tuned circuit and source impedance $R_s$, then:

$$I_{res} = Q.I_1$$

$$I_2 = k.I_{res}$$

from which it follows that $I_1$ can equal $I_2$, if:

$$k.Q = 1$$

This implies that the worse the coupling factor k, the higher the necessary Q; if the inductances of inductors 22 and 23 are fixed, then the worse the coupling factor, the higher the required value of capacitor 25.

The foregoing Can be applied to a flyback converter by considering the primary leakage inductance and the secondary inductance to be the inductors 22 and 23 respectively that have limited coupling k, and then providing a tuning capacitor across the transformer primary leakage inductance to give a Q value appropriate to the coupling factor k. Of course, in the case of the flyback converter, there is no direct equivalent to the ac source 24 but instead there is the energy in the primary leakage inductance which upon turn off of the input-circuit switching device, will set up a ringing in the tuned circuit. Additionally, the tuning capacitor cannot simply be coupled across the primary leakage inductance but necessarily will also parallel the main primary inductance (this is dealt with further hereinafter).

Figure 1:
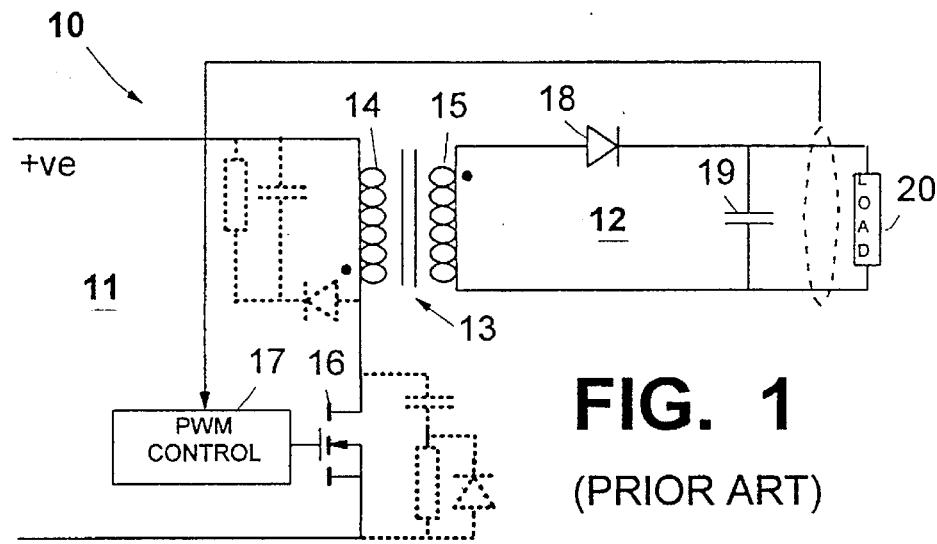
FIG. 1 is a circuit diagram of a known flyback converter.
Figure 2:
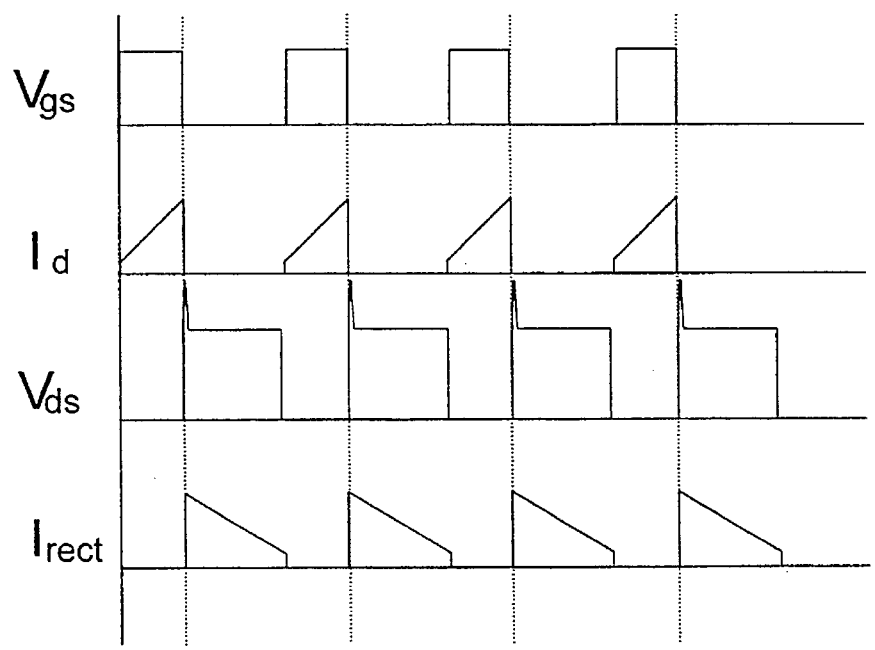
FIG. 2 shows voltage and current time plots illustrating operation of the FIG. 1 converter.
Figure 4:
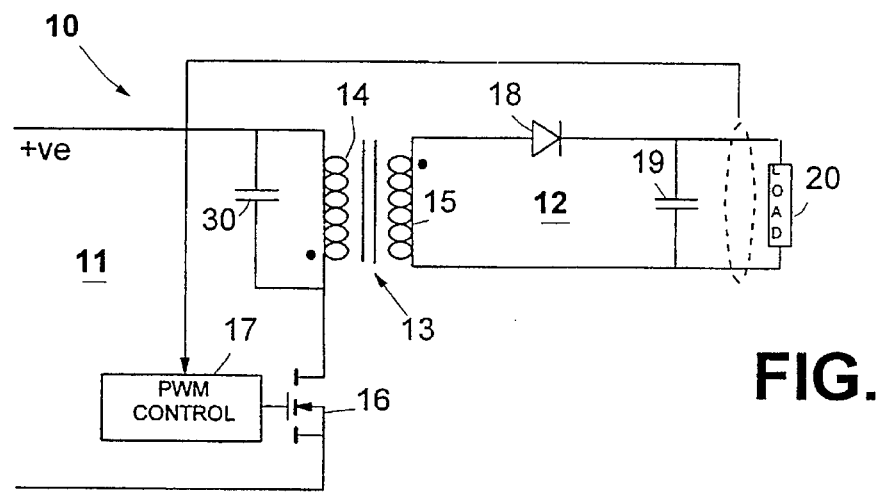
FIG. 4 is a circuit diagram of a flyback converter provided with a tuning capacitor across its transformer primary winding to cause a ringing effect with the primary leakage inductance of the converter transformer.
Figure 5:
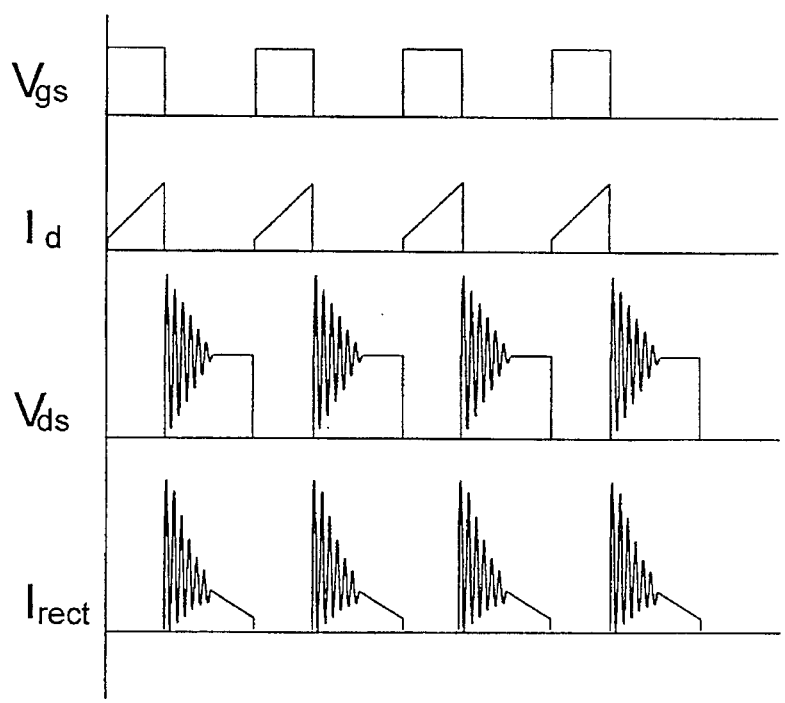
FIG. 5 shows voltage and current time plots illustrating operation of the FIG. 4 converter.

FIG. 4 shows the FIG. 1 flyback converter 10 to which a tuning capacitor 30 has been added in parallel with the primary winding 14 to set up the ringing conditions described above. FIG. 5 illustrates for the FIG. 4 converter the same voltage and current timeplots as shown in FIG. 2 in respect of the FIG. 1 converter. As can be seen, the presence of the primary tuning capacitor creates a substantial ringing in the drain voltage $V_{ds}$ of the MOSFET 16 and in the current $I_{rect}$ through the output-circuit diode 18.

Figure 6:
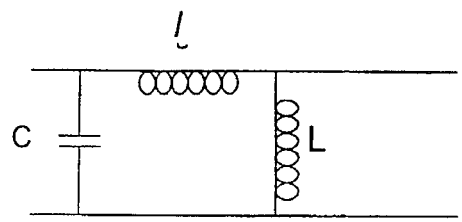
FIG. 6 is a Simplified equivalent circuit for the transformer and tuning capacitor arrangement of the FIG. 4 flyback converter.

To understand better the effect of the capacitor 30, reference will now be had to the simplified equivalent circuit shown in FIG. 6 for the transformer 13 and tuning capacitor 30 of the FIG. 5 converter. The tuning capacitor 30 is represented by a capacitance of value C. The transformer is represented, as viewed from the primary side, as a leakage inductance of value "1" and a main inductance of value "L", these inductances being combinations of the primary and secondary leakage and main inductances respectively; the resistive and magnetising force elements required to more fully represent a real transformer have been omitted for simplicity of explantion. For the same reason, it will be assumed below that the transformer 13 has a turns ratio "n" of unity thereby avoiding the need to introduce a factor of $n^2$ when transferring impedances from one side of the transformer to the other; it will be readily apparent to persons skilled in the art that the generality of the following explanations will apply equally to cases where the turns ratio n is other than unity and the resistive and magnetising force elements of the transformer are taken into account.

Figure 7:
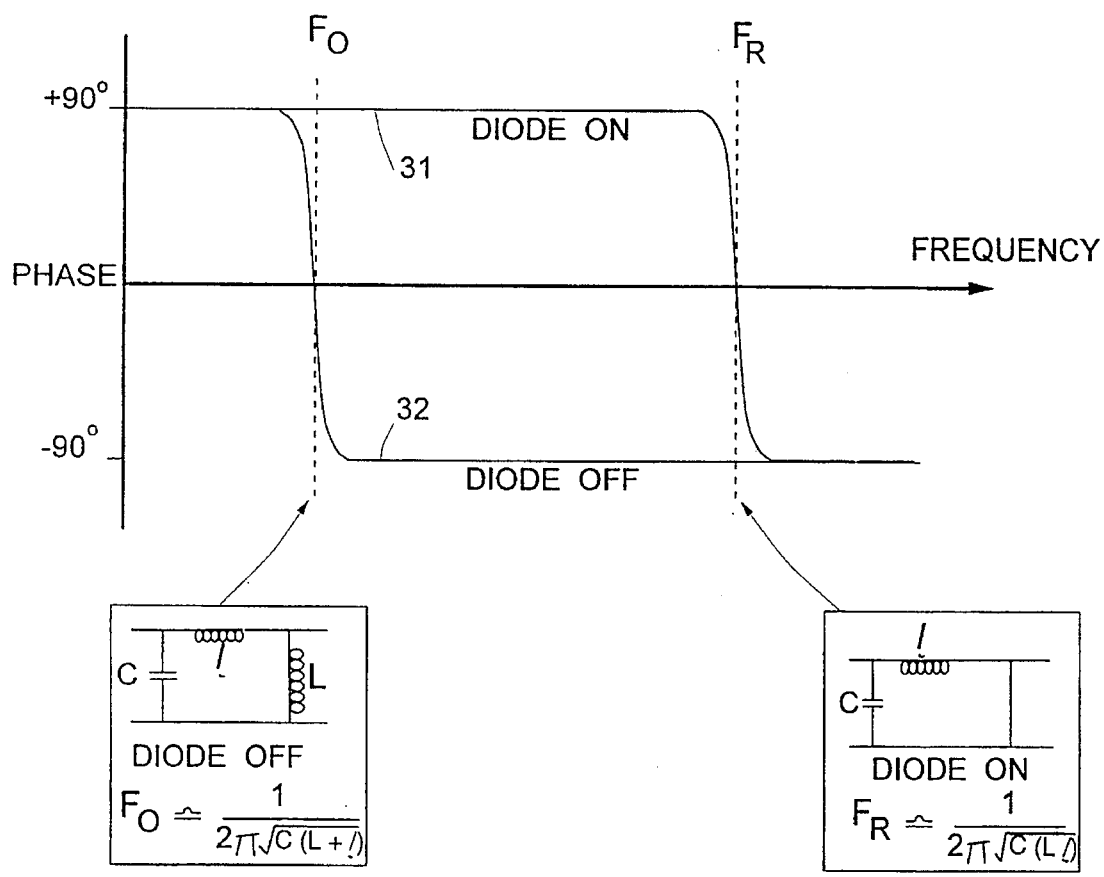
FIG. 7 is a diagram illustrating the phase response of the FIG. 4 circuit as viewed across the transformer primary.

Following turn off of the MOSFET 16, the diode 18 staffs to conduct. In ac terms, the conduction of diode 18 effectively shorts the secondary winding 15 so that, referring to FIG. 6, the inductance L plays no part in determining the response of the equivalent circuit. In effect, the capacitor 30 and transformer 13 form a parallel resonant circuit made up of the capacitance C and leakage inductance 1. It is this resonant circuit which determines the frequency $F_R$ of the ringing caused upon turn off of MOSFET 16 by the energy in the leakage inductance. FIG. 7 shows the current/voltage phase response characteristic 31 of the FIG. 4 converter as viewed at the transformer primary for the case when the diode is conducting (ON); as would be expected, phase reversal occurs at the ringing frequency $F_R$. The expression given for $F_R$ in FIG. 7 is, of course, only approximate.

For periods when the diode 18 is non-conducting, the inductance L plays a full role in determining the response of the FIG. 6 equivalent circuit. In particular, the capacitance C and inductances 1 and L now form a different resonant circuit with a resonant frequency $F_o$ lower than the ringing frequency $F_R$. This resonance at frequency $F_o$ generally does not effect the operation of the FIG. 4 converter provided, of course, that the switching frequency of the MOSFET is sufficiently spaced from the frequency $F_o$. FIG. 7 shows the phase response characteristic 32 of the FIG. 4 converter for the case where the diode 18 is non-conducting (OFF); as with $F_R$, the expression given for $F_o$ in FIG. 7 is only approximate.

From the foregoing, it can be seen that the provision of a tuning capacitor 30 across the primary winding 14 of the converter transformer has the effect of making visible on the secondary side of the transformer, as a ringing at frequency $F_r$, the energy released from the primary leakage inductance upon turn off of the MOSFET 16. However, this does not in fact result in any energy transfer from the primary leakage inductance to the load 20 because unlike the FIG. 3 arrangement, the FIG. 4 converter has a dc load and the ringing is an ac phenomenum. Something more therefore needs to be done to effect the desired energy transfer.

In general terms, the present invention provides for the generation, as part of the secondary current, of a component at the same frequency as, but in anti-phase to, the ringing frequency component; these components are then mixed in a non-linear device (which will generally be the rectifier diode itself) to give a dc component useful for powering the load.

Figure 8:
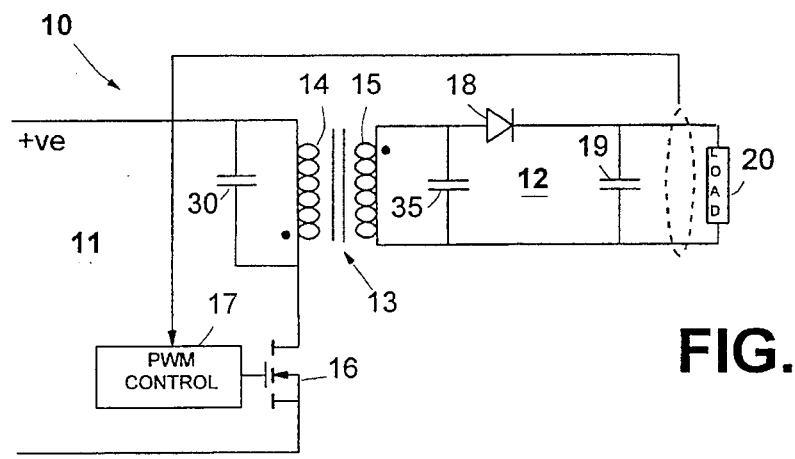
FIG. 8 is a circuit diagram of a first form of flyback converter embodying the invention, this converter being provided with tuning capacitors across both its primary and secondary windings and a non-linear device in its output circuit, the non-linear device being constituted by the output circuit diode.

The generation of this anti-phase frequency component is achieved by the provision of an appropriately-valued second tuning capacitor across the secondary winding of the converter transformer. FIG. 8 illustrates the provision of such a tuning capacitor 35 added to the FIG. 4 converter.

Figure 9:
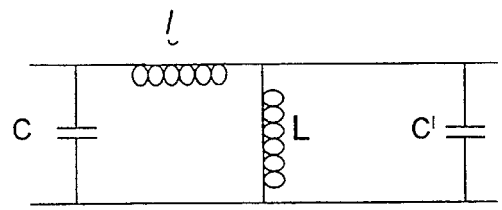
FIG. 9 is a simplified equivalent circuit for the transformer and tuning capacitor arrangement of the FIG. 8 flyback converter.

FIG. 9 depicts the transformer equivalent circuit produced by the addition of capacitor 35, this equivalent circuit corresponding to that of FIG. 6 but with addition of a capacitance C' corresponding to the value of capacitor 35 (it being recalled that the transformer is, for simplicity, assumed to have a turns ratio n of unity).

Figure 10:
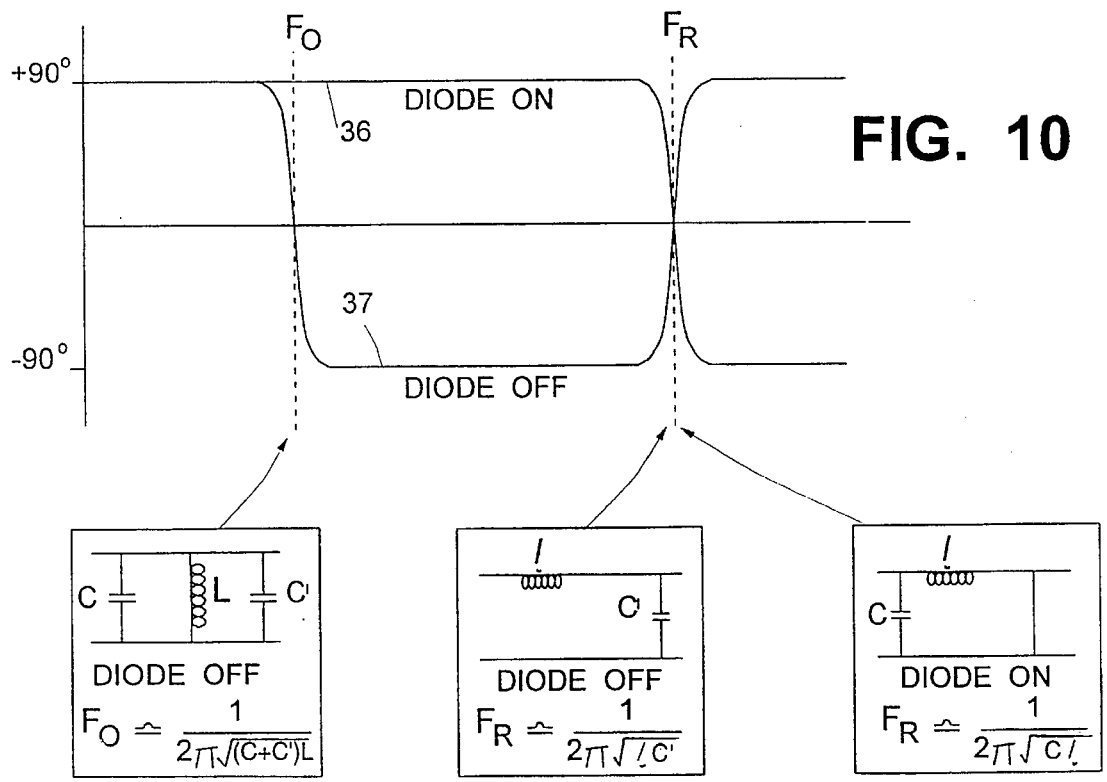
FIG. 10 is a diagram illustrating the phase response of the FIG. 8 circuit as viewed across the transformer primary.

The effect of the second tuning capacitor may be understood in qualitive terms by reference to the FIG. 9 equivalent circuit and to the phase response characteristics shown in FIG. 10 for the FIG. 8 converter for the diode conducting (ON) and diode non-conducting (OFF) conditions.

For the diode conducting condition, the frequency characteristics of the FIG. 8 converter are substantially the same as for the FIG. 4 converter because the second tuning capacitor 35 is effectively shorted; thus, there exists a parallel resonant circuit involving the capacitance C (the first tuning capacitor 30) and the leakage inductance 1, the resonant frequency of this resonant circuit being $F_R$. Phase reversal occurs at the frequency $F_R$ as can be seen from the phase response characteristic 36 shown in FIG. 10 for the diode on condition.

For the diode non-conducting condition, the second tuning capacitor C' has a significant effect on the frequency characteristics of the FIG. 8 converter as compared to the FIG. 4 converter. There still exists a low-end resonance involving the main inductance L; however, now both the capacitances C and C' are involved so that the frequency $F_o$ of this resonance will be lower than that of the corresponding frequency $F_o$ for the FIG. 4 converter. A phase reversal occurs at this resonance frequency $F_o$ as can be seen from the phase response characteristic 37 shown in FIG. 10 for the diode off condition (again, note that the formula given for $F_o$ in FIG. 10 is highly approximate as can be seen by the omission of the leakage inductance 1). In addition to the low-end resonance at frequency $F_o$, there is a second, higher, resonance which is a series resonance involving the leakage inductance 1 and the capacitance C' (the second tuning capacitor 35); the value of C' is chosen such that this resonance occurs at the frequency $F_R$, that is, at the same frequency as the diode-on resonance. In practice, selection of C' will generally involve trial and error to find the appropriate value for the particular component values and types used in the circuit. As can be seen from the phase response characteristic 37 shown in FIG. 10 for the diode off condition, a phase reversal occurs at the second resonance frequency $F_r$. A third resonance is also exhibited in the diode-off condition but this occurs at a higher frequency still and is not relevant to the functioning of the FIG. 8 converter and so will not be further considered.

The important point to note is that around the ringing frequency, the phase responses exhibited in the diode-off and diode-on conditions are in anti-phase. It can now be seen that if during the ringing that takes place following turn off of MOSFET 16, a sufficiently large downward swing occurs to take the diode out of conduction, the phase of the current is immediately reversed as operation switches from the diode-on to the diode-off condition and this will drive the diode back into conduction; as a result, a form of synchronous detection occurs converting the ringing into a dc component that can be usefully dissipated in the load.

Figure 11:
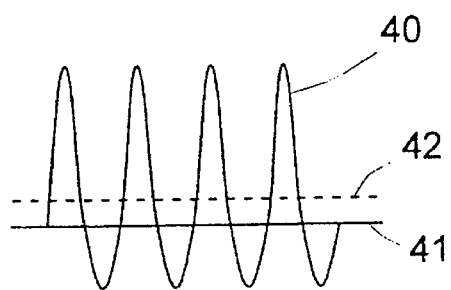
FIG. 11 is a diagram illustrating the effect of the non-linear component in the output circuit of the FIG. 8 converter.

Of course, the ringing will not consistently be of sufficiently large amplitude to take the diode out of conduction. However, even with the diode conducting, the characteristics of the circuit will not wholly be those of the diode-on condition because in practice there is not a complete short across the transformer secondary winding; there will thus effectively co-exist the diode-on and diode-off conditions with the former dominating. The presence of these anti-phase components is not itself of much value (they simply together produce a zero-mean waveform)—instead, the components must be mixed to produce a dc component. This mixing is achieved in the FIG. 8 converter by the diode 18 as a result of its non-linear forward voltage/current characteristic. More particularly, the diode 18 has a forward resistance $R_f$ of the following approximate form:

$$R_f = 0.025/I_f$$

where $I_f$ is the forward current through the diode. Now consider what happens as the current through the diode begins to fall with a negative-going swing of the predominant component of the ringing frequency (that is, the diode-on component which, for convenience, will be referred to below as the "phase" component whilst the other component will be referred to as the "anti-phase" component). As the diode current decreases, the diode resistance increases and the circuit characteristics moves towards the diode-off condition increasing the antiphase component of the ringing; the result of this is to reduce the downward swing of the ringing in a progressive manner, the deeper the downward swing, the greater the compensatory anti-phase component of the ringing. The effect is illustrated in FIG. 11 which shows in highly diagrammatic form the ringing waveform 40 produced as a result of the progressive compensatory contribution of the anti-phase component. Also in FIG. 11, line 41 depicts the mean of the ringing without the progressive compensatory effect of the anti-phase component whilst line 42 depicts the mean of the waveform 40; it can be seen that the mean value has been raised which is equivalent to there now being a dc component to the ringing. It is this dc component that passes through the diode and dissipates energy from the primary leakage inductance in the load.

Although the ringing is not completely converted into a dc component by the above mechanism, a large proportion of the energy stored in the primary leakage inductance can still be transferred to the load. The effect on the $V_{ds}$ and $I_{rect}$ waveforms is to very significantly reduce the magnitude of the ringing waveforms from those shown in FIG. 5.

It may be noted that to some extent the effectiveness of the foregoing mechanism will depend on where on the diode's forward characteristic the ringing takes place; in other words, the effectiveness to some extent will depend on the loading of the converter. The expected converter load therefore needs to be considered in the design and may influence the choice of diode type.

Figure 12:
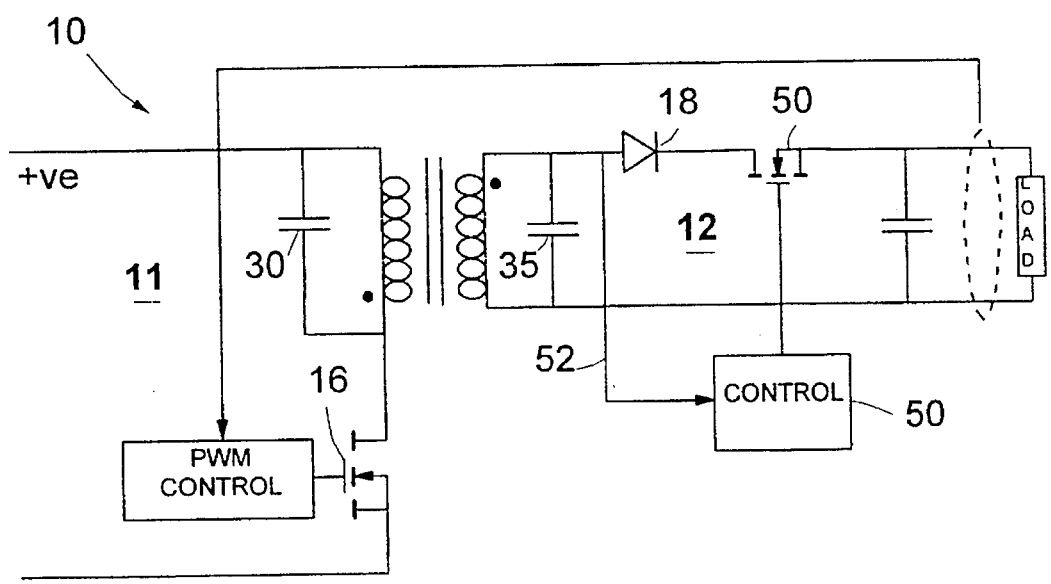
FIG. 12 is a circuit diagram of a second form of flyback converter embodying the invention, this converter being similar to that shown in FIG. 8 but with a MOSFET used as the non-linear device in the converter output circuit.

FIG. 12 illustrates a variant of the FIG. 8 converter in which a MOSFET 50 is used as the non-linear device generating a dc component from the ringing current (the diode 18 is still present but is not relied to effect mixing of the phase and anti-phase ringing components). The MOSFET 50 is inserted into the output circuit after the diode 18 and is controlled by control block 51 such that it is switched on and off in synchronism with the ringing (as sensed on line 52). During the positive-going peaks of the ringing the MOSFET 50 is turned on whilst during the troughs of the ringing the MOSFET 50 is turned off or the other way around, respectively creating a positive or negative current through the load.

By solving the energy loss problem of the transformer leakage inductance using primary and secondary tuning capacitors, the potential for another energy-dissipation problem to occur has arisen. In particular, the tuning capacitors 30 and 35 can contain a considerable amount of energy and if the MOSFET switching device 16 is controlled in the normal fixed-frequency PWM mode, the tuning capacitors will be discharged through the MOSFET 16 when the latter is turned on. Depending on the situation, the resultant energy dissipation can exceed the original leakage inductance related energy loss in a normal flyback converter.

Figure 13:
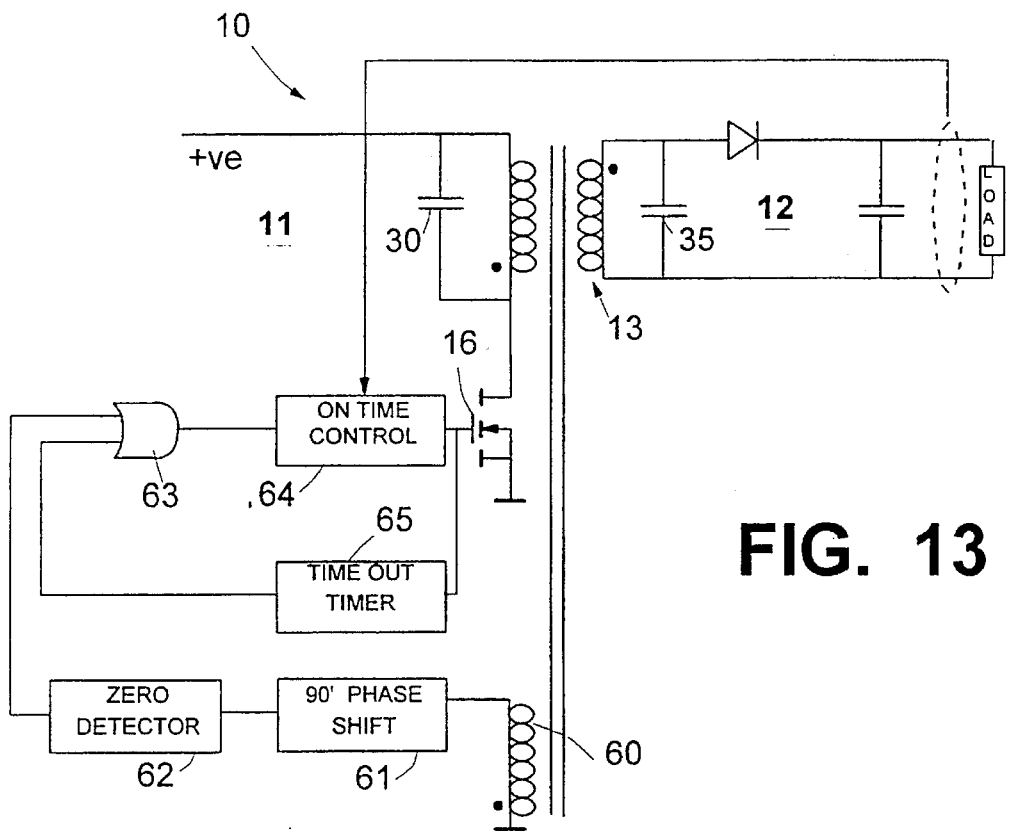
FIG. 13 is a circuit diagram of a third form of flyback converter embodying the invention, this converter being similar to that shown in FIG. 8 but with turn on of the input-circuit switching device being controlled to occur at minimums of the voltage across the device.
Figure 14:
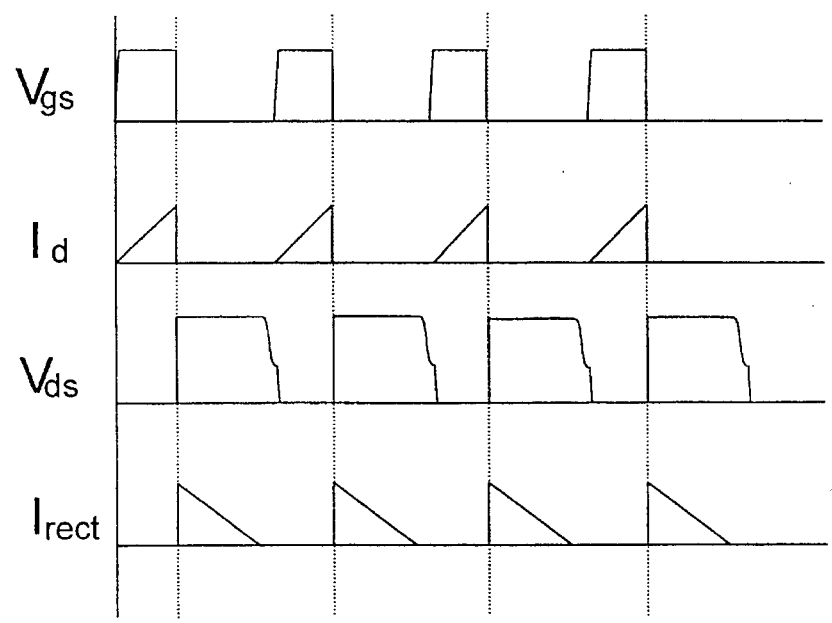
FIG. 14 shows voltage and current time plots illustrating operation of the FIG. 13 circuit.

To minimise the energy dissipation in the MOSFET switching device 16, it is best to switch on the MOSFET 16 when the drain voltage is as low as possible. This point occurs at the moment when following the transformer core being discharged the voltage swings back at the low-end diode-off resonant frequency $F_o$. FIG. 13 shows a variant of the FIG. 8 flyback converter in which the turn-on of the MOSFET 16 is controlled to occur at this minimum voltage point of the MOSFET drain voltage. FIG. 14 shows the $V_{gs}$, $I_d$, $V_{ds}$ and $I_{rect}$ waveforms for the FIG. 13 converter.

Referring to the $V_{ds}$ waveform in FIG. 14, the falling edge of the waveform can be seen to be sinusoidal in form, this being the voltage swing occuring at frequency $F_o$ immediately following discharge of the transformer core. The minimum of this voltage. swing is sensed in the FIG. 13 converter by an arrangment comprising a sensing coil 60 wound on the transformer core, an integrator 61 that effectively shifts the sinusoidal swing through a 90° phase shift, and a zero crossing detector 62 that detects the zero crossing of the integrator output, these zero-crossings corresponding to minimums of the sensed waveform. The output of the zero-crossing detector takes the form of a trigger signal fed via an OR circuit 63 to an on-time control block 64 to initiate turn on of the MOSFET 16. The actual on-time duration is determined by the level of the fedback output voltage, again with the objective of keeping the latter constant.

It may be noted that the MOSFET 16 is no longer switched on and off at a fixed frequency, the switching frequency now being effectively load dependent. It may also be noted that it is inherent in the operation of the FIG. 13 converter that it operates at the boundary between continuous and discontinuous modes of operation; accordingly, the current $I_{rect}$ through the diode 18 falls to zero just before the MOSFET 16 is turned on again.

In order to cover situations (such as start up) when there is no drain voltage minimum to detect, a time-out circuit 65 is provided to ensure that a turn-on trigger signal is fed to the on-time control block a predetermined time after the gate signal $V_{gs}$ was last high, unless the MOSFET is earlier turned on again by a trigger signal from the zero-crossing detector 62.

Figure 15:
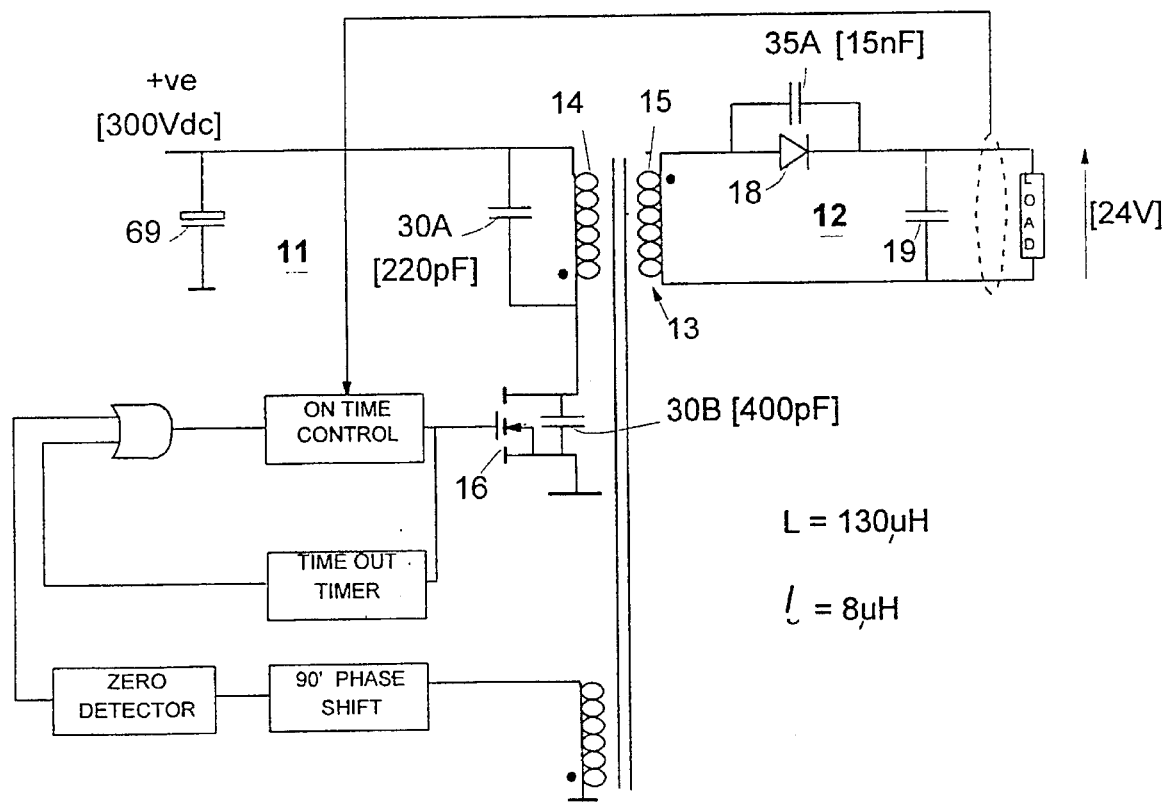
FIG. 15 is a circuit diagram of an implementation of the FIG. 13 circuit.

FIG. 15 shows an implementation of the FIG. 13 converter with example values of the key components. Attention is drawn to the arrangement of the primary and secondary tuning capacitances C and C'. In particular, the primary tuning capacitance C which in FIG. 13 was represented as provided by the capacitor 30 connected across the primary winding 14, is provided by a capacitor 30A across winding 14 together with the source-drain capacitance 30B of the MOSFET 16. This latter capacitance 30B is in ac terms in parallel with the capacitor 30A (reservoir capacitor 69 ensuring this); if the value of capacitance 30B is sufficient, the capacitor 30A can be dispensed with entirely. As regards the secondary tuning capacitance C' which in FIG. 13 was represented as provided by the capacitor 35 connected across the secondary winding 15, in FIG. 15 this capacitance C' is provided by a capacitor 35A connected across the diode 18. Again, this arrangement is equivalent in ac terms to connecting the capacitor in parallel with the secondary winding 15 (it may be noted that capacitor 19 is large enough that even though it is in series with the capacitor 35A when the diode is off, its impedance can be ignored; additionally, when the diode is on, the capacitor provides an effective ac short). A combination of capacitors connected across the secondary winding 15 and diode 18 can also be used to provide capacitance C'. Furthermore, where the converter has multiple output circuits 12, the capacitance C' can be distributed between these output circuits.

Figure 16:
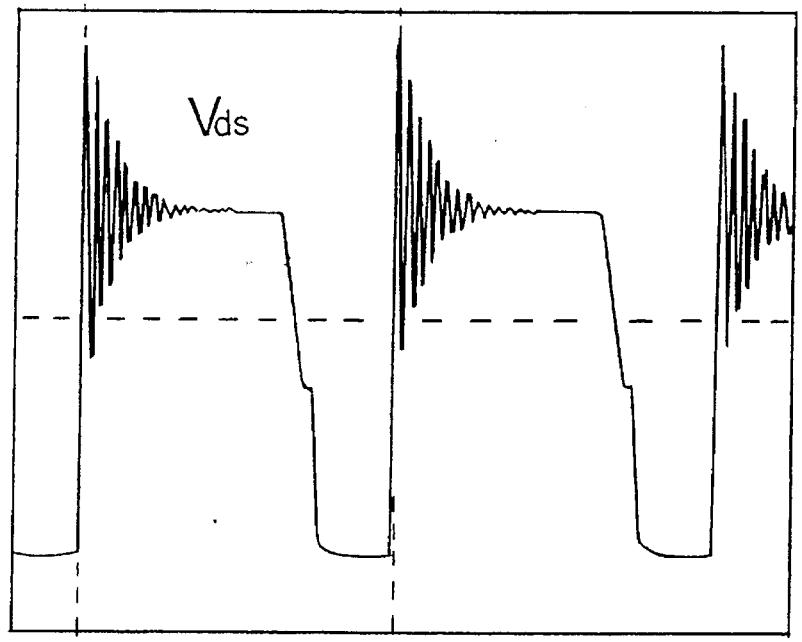
FIG. 16 is a voltage/time graph showing the voltage across the input-circuit switching device for the FIG. 15 circuit but with the secondary tuning capacitor removed.
Figure 17:
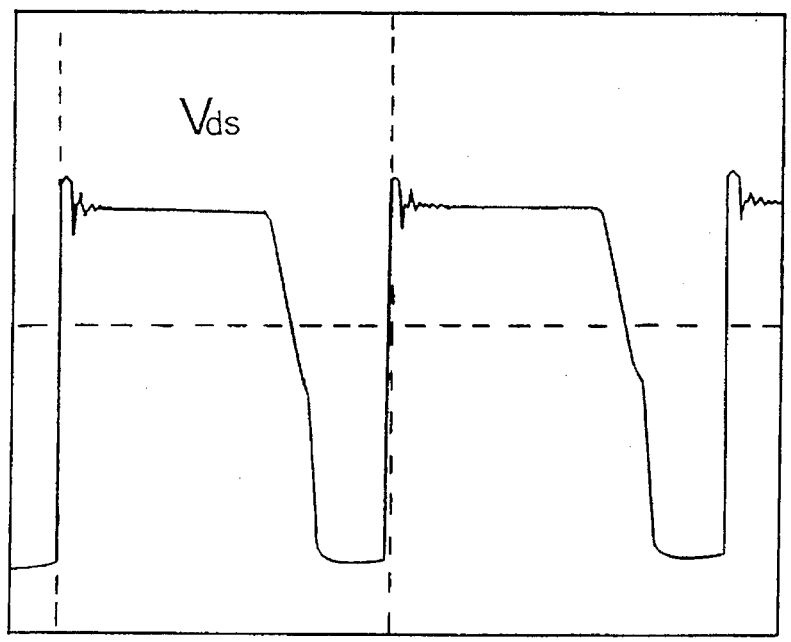
FIG. 17 is a voltage/time graph similar to FIG. 16 but with the secondary tuning capacitor connected.

FIGS. 16 and 17 show oscillograms of the drain voltage of MOSFET 16 for the FIG. 15 converter, the FIG. 16 waveform being for the case where the secondary tuning capacitor has been disconnected so that substantial ringing is exhibited as for the FIG. 4 converter. The FIG. 17 oscillogram is for the case where the secondary tuning capacitor is connected and, as can be seen, the ringing has largely disappeared. FIGS. 16 and 17 also clearly show the sinusoidal form of the falling edge of the waveform.

Figure 18:
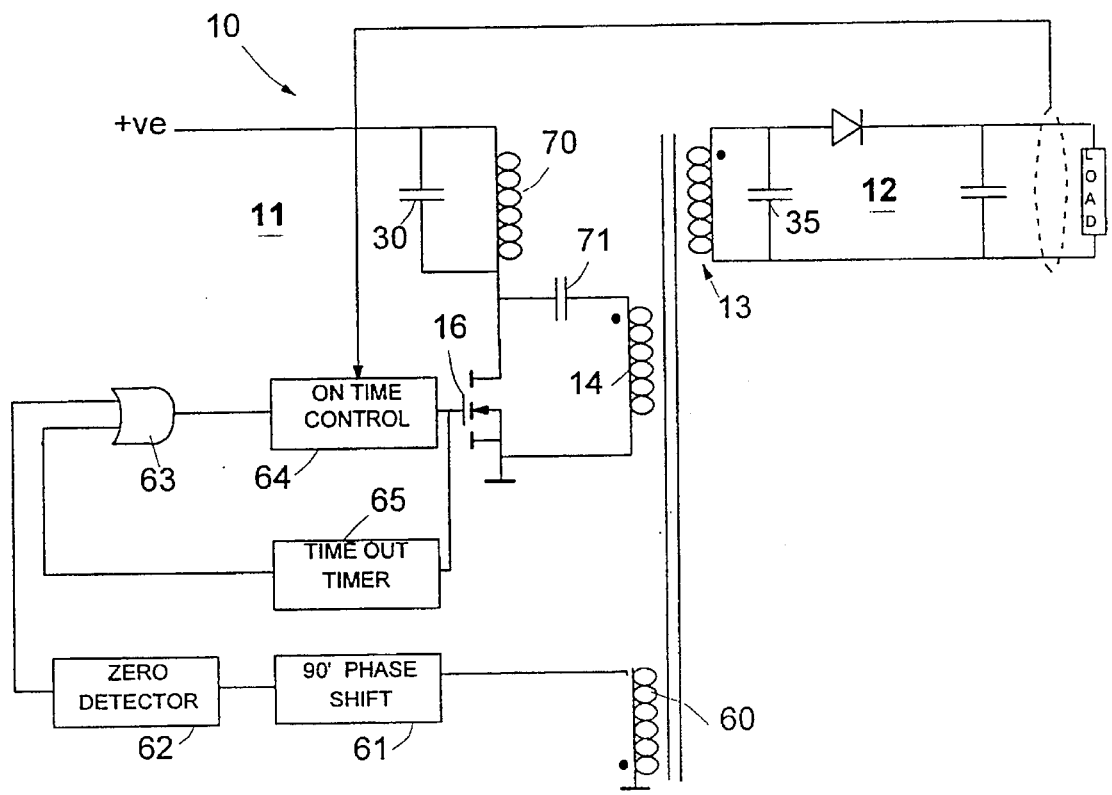
FIG. 18 is a circuit diagram of a variant of the FIG. 13 circuit showing a different connection arrangement for the input circuit switching devices.

It will be appreciated that many variants are possible to the above-described embodiments of the invention. Thus, whilst the switching device 16 will generally be connected in series with the primary winding 14, other arrangements are also possible by which the switching device can control energisation of the primary winding. One such arrangement is shown in FIG. 18 where an inductor 70 is connected in series with the switching device 16 and the primary winding 14 is connected across the switching device through a capacitor 71. The value of the capacitor 71 is such that at the switching frequency of the device 16, the capacitor 71 acts as an ac short thus effectively placing the primary winding in parallel with the inductor 70. The switching device 14 is controlled in the same manner as for the circuit of FIG. 13 and the voltage waveforms on the drain of the MOSFET switching device and across the secondary winding are substantially the same as for the FIG. 13 circuit. The effect of the tuning capacitors 30 and 35 is also the same as for the FIG. 13 circuit (note that because in ac terms the primary winding 14 is effectively in parallel with the inductor 70, connecting the tuning capacitor 30 across the inductor 70 rather than across the primary winding, does not affect the action of the tuning capacitor). The FIG. 18 circuit is particularly useful in giving good power factor characteristics when used to provide a regulated dc output from a rectified ac mains input. In such an application, the capacitor 71 is chosen with a value to block mains ripple; even so, it will generally be necessary to include a low pass filter in the output-voltage feedback loop. The basic arrangement of the FIG. 18 circuit forms the subject matter of our co-pending European Patent Application of the same date entitled "Switched Mode Power Supply with Power Factor Correction". Reference is directed to that application for a more detailed description of the operation of the FIG. 18 circuit.

I claim:

1. A flyback converter comprising an input circuit coupled to an output circuit through an energy storing transformer that has primary and secondary windings each with main and leakage inductances; the input circuit comprising a switching device connected to regulate energisation of said primary winding, and control means for controlling the cyclic turning on and off of the switching device; and the output circuit comprising a diode connected in series with said secondary winding, and a reservoir capacitor connected in parallel with the series combination of the secondary winding and diode and across which the converter output is produced; characterised in that first and second tuning capacitances are provided that parallel, in ac terms, said primary and secondary windings respectively, these tuning capacitances having values such that:

with the diode in a conducting state a first resonant circuit is formed, with resonant frequency $F_R$, in which the primary leakage inductance and said first tuning capacitance play significant pans, and with the diode in a non-conducting state a second resonant circuit is formed, with resonant frequency substantially equal to said frequency $F_R$, in which the primary leakage inductance and said second tuning capacitance play significant parts but for which there exists a voltage/current phase relationship either side of resonance that is anti-phase to that for said first resonant circuit;

the output circuit including a non-linear device operative to combine the anti-phase components of ringing produced by said first and second resonant circuits following turn off of the switching device, whereby energy stored in the primary leakage inductance is at least partially transferred to the secondary circuit and converted into a dc component of the converter output.

2. A flyback converter according to claim 1, wherein said first tuning capacitance is provided at least in part by a capacitor connected across said primary winding.

3. A flyback converter according to claim 1, wherein said switching device is a MOSFET and said first tuning capacitance is provided at least in part by the drain-source capacitance of the MOSFET.

4. A flyback converter according to claim 1, wherein said second tuning capacitance is provided at least in part by a capacitor connected across said secondary winding.

5. A flyback converter according to claim 1, wherein said second tuning capacitance is provided at least in part by a capacitor connected across said diode.

6. A flyback converter according to claim 1, wherein the converter is provided with multiple said output circuits each coupled to said primary winding through a respective said secondary winding of the transformer; said second tuning capacitance being divided between said output circuits.

7. A flyback converter according to claim 1, wherein said non-linear device is constituted by said diode.

8. A flyback converter according to claim 1, wherein said non-linear device comprises a MOSFET connected in series with said diode, and means for switching the MOSFET on and off at synchronism with said ringing.

9. A flyback converter according to claim 1, wherein said control means comprises sensing means for sensing the voltage across the switching device when the latter is off, determining means for determining a minimum of the voltage sensed by said sensing means, and turn-on means for turning on the switching device at a said minimum of the voltage thereacross as determined by said determining means.

10. A flyback converter according to claim 9, wherein said sensing means comprises a sensing winding wound jointly with said primary and secondary windings, and said determining means comprises integration means for integrating the voltage sensed by said sensing winding, and means for detecting a zero crossing of the voltage integrated by said integration means, this zero crossing being indicative of the said minimum of the voltage across the switching device.

11. A flyback converter according to claim 9, wherein said control means further comprises means for controlling the duration of the on time of the switching device in dependence on the voltage produced at the output of the converter such as to maintain the converter output voltage substantially constant.

12. A flyback converter according to claim 9, wherein said control means further comprises time-out means for initiating turn on of the switching device a predetermined time after when switching device was last on unless the latter is earlier turned on again by said turn-on means.

13. A flyback converter according to claim 9, wherein said input circuit further comprises an inductor connected in series with said switching device, and a capacitor connected in series with said primary winding across the switching device.

* * * * *

UNITED STATES PATENT AND TRADEMARK OFFICE
CERTIFICATE OF CORRECTION

PATENT NO : 5,608,613
DATED : March 4, 1997
INVENTOR(S) : Arian Jansen

It is certified that error appears in the above-identified patent and that said Letters Patent is hereby corrected as shown below:

Column 10, line 30, change "pans" to -- parts --.

Signed and Sealed this

Fourth Day of May, 1999

Attest:

Q. TODD DICKINSON

*Attesting Officer*  *Acting Commissioner of Patents and Trademarks*